United States Patent [19]

Brock et al.

[11] Patent Number: 5,556,912
[45] Date of Patent: Sep. 17, 1996

[54] AQUEOUS BINDER DISPERSION FOR PHYSICALLY DRYING COATING COMPOSITIONS AND USE THEREOF

[75] Inventors: Thomas Brock, Hurth; Klaus Wandelmaier, Wuppertal, both of Germany

[73] Assignee: Herberts GmbH, Wuppertal, Germany

[21] Appl. No.: 361,202

[22] Filed: Dec. 21, 1994

[30] Foreign Application Priority Data

Dec. 23, 1993 [DE] Germany ............... 43 44 063.0

[51] Int. Cl.$^6$ ............... C08J 3/00; C08K 3/20; C08L 75/00; B05D 1/36
[52] U.S. Cl. ............... 524/507; 524/539; 524/591; 524/839; 524/840; 525/123; 525/455; 427/258
[58] Field of Search ............... 524/507, 539, 524/591, 839, 840; 525/123, 455; 427/258

[56] References Cited

U.S. PATENT DOCUMENTS

| 4,467,078 | 8/1984 | Kolycheck et al. | 525/455 |
| 5,011,881 | 4/1991 | Fujji et al. | 524/507 |

Primary Examiner—Paul R. Michl
Assistant Examiner—Patrick Niland
Attorney, Agent, or Firm—Schweitzer Cornman & Gross

[57] ABSTRACT

Improved aqueous binder dispersions including polyurethanes and water-based physically drying coating compositions containing these aqueous dispersions which are particularly suitable for plain and metallic colored base coats employed for automotive repair lacquer coatings.

5 Claims, No Drawings

AQUEOUS BINDER DISPERSION FOR PHYSICALLY DRYING COATING COMPOSITIONS AND USE THEREOF

BACKGROUND OF THE INVENTION

This invention relates to aqueous binder dispersions and to water-based physically drying coating compositions containing these dispersions which are in particular suitable for plain and metallic coloured base coats.

There is an industrial and commercial requirement for physically drying coating compositions which are in particular suitable for repair lacquer coatings of various substrates, such as metal articles, in particular in the automotive sector or for the lacquer coating of machinery. Coating compositions are required for such purposes which dry or cure at room temperature or with slight heating, for example to temperatures of up to 60° C.

OBJECT OF THE INVENTION

Such physically drying coating compositions, which are for example suitable for automotive repair lacquer coatings, are known, for example from DE-A-41 15 015 and DE-A-41 15 042. However, in multicoat structures these known coating compositions based on polyurethane binders still exhibit disadvantages in comparison with conventional solvent-borne base lacquers. In particular, the hardness of the overall structure is inadequate.

SUMMARY AND DETAILED DESCRIPTION OF THE INVENTION

DE-A-41 22 265 also describes polyurethane dispersions which, after conversion into the aqueous phase, are inter alia suitable for the production of metallic and plain base lacquers. The polyurethane dispersions are produced by free-radical initiated polymerisation of polyurethane macromonomers with lateral vinyl groups. The principal disadvantage of these coating compositions is inadequate water resistance, which in particular becomes evident under automotive repair lacquer coating conditions.

DE-A-39 36 794 describes polyurethaneureas and the use thereof as binders in aqueous metallic base lacquers. The binder contains at least 200 milliequivalents of chemically incorporated carbonate groups per 100 g of solids. However, in comparison with solvent-based base lacquers, base coats on this basis exhibit deficient hardness of the overall structure, in particular when overcoated with conventional clear lacquers.

The as yet unpublished German patent application P 43 23 896 describes further aqueous polyurethane dispersions which are resistant to hydrolysis and stable in storage and are obtained by chain extension of a polyurethane prepolymer with polyisocyanate. They may be used in multicoat lacquer coatings for topcoat lacquer and base coats. Unsatisfactory water resistance is achieved with the described polyurethane dispersions under the special conditions of automotive repair lacquer coating or similar applications requiring low curing temperatures.

The object of the invention is to provide binders for water-based physically drying coating compositions which, as the base lacquer in a multicoat structure, achieve the characteristics of conventional base lacquers, in particular with regard to hardness and water resistance.

This object is achieved by an aqueous dispersion of a binder suitable for coating compositions, which dispersion contains a mixture of A) 45 to 95 wt. % of one or more polyurethanes, obtainable by free-radical initiated polymerisation of polyurethane macromonomers containing carboxyl, phosphonic and/or sulphonic acid groups and lateral vinyl groups, optionally together with terminal vinyl, hydroxy, urethane, thiourethane and/or urea groups in the presence of one or more unsaturated monomers copolymerisable with the polyurethane macromonomer, in the form of an aqueous dispersion and B) 5 to 55 wt. % of one or more polyurethane resins containing ionic groups containing neither urea nor carbonate groups, which resins have a number average molar mass ($M_n$) of 10000 to 300000 and an acid value of 5 to 50 in the form of an aqueous dispersion, obtainable by preparing a polyurethane prepolymer containing OH groups and having an OH value of 5 to 75 and a number average molar mass ($M_n$) of 5000 to 50000 by the reaction in an organic medium of
  a) one or more isocyanate-reactive compounds with an acid value of 0 to 10 in the form of
    a1) 70 to 100 wt. % of one or more polyester polyols and/or polyether polyols, in particular polyester diols and/or polyether diols with a molecular weight of 500 to 6000, together with
    a2) 30 to 0 wt. % of one or more compounds differing from a1) with at least two isocyanate-reactive groups with a molecular weight of 60 to 400 with
  b) one or more reaction products containing free isocyanate groups prepared from
    b3) at least one compound with two isocyanate-reactive groups and at least one anionic group or group capable of anion formation and
    b2) one or more organic diisocyanates
in a quantity ratio such that the molar ratio of the isocyanate-reactive groups of b1) to the isocyanate groups of b2) is 1:1.5 to 1:2.5, wherein the reaction product b) may be produced in the presence of component a), wherein component b) is used in such a quantity that the finished polyurethane resins have the desired acid value and with
  c) one or more polyisocyanates with at least two free isocyanate groups per molecule in a quantity such that the molar ratio of the OH groups of component a) to the NCO groups of components b) and c) is 1.01:1 to 3:1, whereupon, before or after partial or complete neutralisation of groups which may be converted into ionic groups in the organic medium or after conversion into the aqueous phase, the prepolymer obtained from a), b) and c) is subjected to chain extension by reaction with
  d) one or more polyfunctional isocyanates with a free NCO group functionality of at least 1.8, in proportions such that the finished polyurethane resins have the desired number average molar mass, wherein the wt. % of the components A) and B) each relate to the resin solids content.

The present invention also provides aqueous coating compositions containing:

8 to 20 wt. %, related to resin solids, of one or more dispersions as described above, 50 to 90 wt. % water, 0 to 20 wt. % of one or more organic solvents, 0.1 to 20 wt. % of one or more effect pigments and/or chromophoric pigments and/or extenders, neutralising agent to achieve a degree of neutralisation of the neutralisable groups of the binder of 40–120%, optionally together with customary additives and auxiliary substances.

Component A) of the binder used according to the invention comprises one or more polyurethanes produced by free-radical initiated polymerisation of polyurethane macromonomers containing carboxyl, phosphonic and/or sulphonic acid groups and lateral vinyl groups, optionally together with terminal vinyl groups, hydroxyl-, urethane, thiourethane and/or urea groups in an unsaturated monomer copolymerisable with the polyurethane macromonomer and acting as a solvent, optionally in the presence of further different copolymerisable unsaturated monomers or by free-radical initiated polymerisation of the polyurethane macromonomers in a mixture of water and an organic solvent inert towards isocyanate groups, in the presence of unsaturated monomers copolymerisable with the polyurethane macromonomers, and optionally with elimination of the organic solvent by distillation before or after free-radical polymerisation. The polyurethanes are present in the form of aqueous dispersions.

The polyurethane dispersions (component A) may be produced in various manners. One route consists in producing a polyaddition product (polyurethane macromonomer) by polyaddition of polyhydroxy compounds from the group comprising polyhydroxy polyethers, polyhydroxy polyesters or polyhydroxy polycarbonates, and also polyhydroxycarboxylic acids, dihydroxyphosphonic acids and/or polyhydroxysulphonic acids, together with polyisocyanates and a monomer containing at least two hydroxy and at least one vinyl group. The quantity ratios of the reactants, in particular of the polyisocyanate, may here be selected such that a macromonomer with terminal hydroxyl groups is produced. After conversion into an aqueous dispersion, this macromonomer, which also contains carboxyl or sulphonic acid groups and lateral vinyl groups, is polymerised via the vinyl groups with c6polymerisable unsaturated monomers and free-radical initiators to yield the polyurethane dispersion, wherein in this case the polyurethane still bears hydroxyl groups.

In contrast with the above-described variant, a second route consists in selecting the quantity ratio of polyisocyanate such that a macromonomer with terminal isocyanate groups is produced.

This macromonomer additionally contains carboxyl, phosphonic acid and/or sulphonic acid groups, together with lateral vinyl groups. The free isocyanate groups of this macromonomer are then reacted with primary or secondary amines or thioalcohols to yield urea, urethane or thiourethane groups. The macromonomer modified in this manner is then also polymerised via the vinyl groups with copolymerisable unsaturated monomers and free-radical initiators.

A third route consists, as in the second process variant, in producing a polyaddition product by reaction of polyhydroxy compounds from the group comprising polyhydroxy polyethers, polyhydroxy polyesters or polyhydroxy polycarbonates, and also polyhydroxycarboxylic acids, dihydroxyphosphonic acids and/or polyhydroxysulphonic acids, and polyisocyanates and additionally at least one monomer containing at least one vinyl group and at least two hydroxy groups. In this case too, an excess of polyisocyanate is used, such that the resultant macromonomer has lateral vinyl groups together with carboxyl, phosphonic acid and/or sulphonic acid groups together with terminal isocyanate groups. This macromonomer is then reacted with at least one monomer, which in addition to a vinyl group also contains one further group which reacts with isocyanate groups, such as for example a hydroxyl, amino or mercapto group. These monomers may be used alone, but it is also possible to use these monomers mixed with primary or secondary amines, alcohols or thioalcohols. In this manner, a macromonomer is obtained which contains lateral vinyl groups together with terminal vinyl groups. This macromonomer is then also polymerised in a final stage via the vinyl groups with copolymerisable unsaturated monomers and free-radical initiators.

A fourth process variant consists in the monomer, which bears the carboxyl, phosphonic acid and/or sulphonic acid group, first being incorporated into the previously formed macromonomer. In this process variant, a polyaddition product is first formed from polyhydroxy polyethers, polyhydroxy polyesters or polyhydroxycarbonates, polyisocyanates and monomers, which contain both at least one vinyl group and at least two hydroxyl groups. Here too, a molar excess of polyisocyanate is used, such that the resultant macromonomer contains terminal isocyanate groups. In addition, this macromonomer then also contains lateral vinyl groups.

The intermediate product formed may moreover also be chain extended by the isocyanate groups of this polyaddition product being reacted, for example, with diaminocarboxylic acids or diaminosulphonic acids. Here too, the vinyl groups are finally polymerised with copolymerisable unsaturated monomers using free-radical initiation.

Examples of the polyhydroxyl polyethers for production of the polyurethane macromonomers are compounds of the general formula

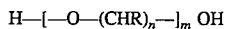

in which

R is hydrogen or a lower alkyl residue (for example with $C_{1-6}$ or $C_{1-4}$, optionally with various substituents, n is a number from 2 to 6 and m is a number from 10 to 120.

Specific examples are poly(oxytetramethylene) glycols, poly(oxyethylene) glycols and poly(oxypropylene) glycols. The preferred polyhydroxy polyethers are poly(oxypropylene) glycols with a molecular weight in the range from 400 to 5000.

Examples of usable polyhydroxy polyesters are those produced by esterification of organic polycarboxylic acids or the anhydrides thereof with organic polyols. The polycarboxylic acids and the polyols may, for example, be aliphatic or aromatic polycarboxylic acids and polyols.

The polyols used for production include, for example, alkylene glycols such as ethylene glycol, butylene glycol, neopentyl glycol and other glycols such as diethylolcyclohexane, together with trishydroxyalkylalkanes, such as for example trimethylolpropane and tetrakishydroxylalkylalkanes, such as for example pentaerythritol.

The acid component of the polyester preferably principally consists of low molecular weight polycarboxylic acids, for example dicarboxylic acids, or the anhydrides thereof with 2 to 18 carbon atoms per molecule. Suitable acids are, for example, phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroneptanedicarboxylic acid, tetrachlorophthalic acid, trimellitic acid and pyromellitic acid. It is also possible to use the anhydrides of these acids, where they exist, instead of the acids. Dimeric and trimeric fatty acids may also, for example, be used as polycarboxylic acids.

Further starting compounds which may be considered are polycarbonate polyols or polycarbonate diols which are, for example, of the general formula $$HO-R'-(O-\underset{\underset{O}{\|}}{C}-O-R')_n-OH$$

in which the residues R' which may be identical or different, mean an alkylene residue. These OH-functional polycarbonates may be produced by reacting polyols such as 1,3-propanediol, 1,6-butanediol, diethylene glycol, triethylene glycol, 1,4-bishydroxymethylcyclohexane, 2,2-(bis(4-hydroxycyclohexyl)propane, neopentyl glycol, trimethylolpropane, pentaerythritol, with dicarbonates, such as dimethyl, diethyl or diphenyl carbonate, or with phosgene. Mixtures of such polyols may also be used.

It is of particular significance to the polyurethane dispersions for the macromonomers which give rise to these dispersions to contain lateral vinyl groups, optionally together with terminal vinyl groups. The term "terminal vinyl groups" is intended to denote vinyl groups attached to the beginning or end of the polymer chain, while lateral vinyl groups are those not attached to the beginning or end of the polymer chain but instead incorporated between the beginning and end.

The lateral vinyl groups in the polyurethane dispersions are obtained by incorporating monomers containing at least two hydroxyl groups and at least one vinyl group into the macromonomer. Examples are trimethylolpropane (TMP) derivatives such as for example TMP-monoallyl ether (2-propenyloxy-2-hydroxymethylpropanol), TMP-mono(meth)acrylate(2-(meth)acryloyloxy-2-hydroxmethylpropanol); glycerol mono(meth)acrylate; addition products of α,β-unsaturated carboxylic acids, such as (meth)acrylic acid, onto diepoxides, for example bisphenol A diglycidyl ethers, hexanediol diglycidyl ethers; addition products of dicarboxylic acids, such as for example adipic acid, terephthalic acid or the like onto (meth)acrylic acid glycidyl esters; monovinyl ethers of polyols.

The polyurethane macromonomers may be produced using customary methods known in urethane chemistry. Catalysts may, for example, be used, such as for example tertiary amines, such as for example triethylamine, dimethylbenzylamine, diazabicyclooctane, together with dialkyltin(IV) compounds, such as for example dibutyltin dilaurate, dibutyltin dichloride, dimethyltin dilaurate. In particular, the reaction proceeds in the presence of a solvent or in the presence of a so-called reactive diluent. Solvents which may be considered are those which may subsequently be eliminated by distillation, for example methyl ethyl ketone, methyl isobutyl ketone, acetone, tetrahydrofuran, toluene, xylene. These solvents may be entirely or partially removed by distillation after production of the polyurethane macromonomers or after free-radical polymerisation. Instead of or in addition to these solvents, it is also possible to use water-dilutable high boiling solvents, for example N-methylpyrrolidone, which then remain in the dispersion. Reactive diluents which may be used are, for example, α,β-unsaturated monomers as are copolymerised in the final state with the macromonomers containing vinyl groups. Example of such monomers, which may also be used as reactive diluents, are α,β-unsaturated vinyl monomers such as alkyl acrylates, alkyl methacrylates and alkyl crotonates with 1 to 20 carbon atoms in the alkyl residue, di-, tri- and tetraacrylates, -methacrylates and -crotonates of glycols, tri- and tetrafunctional alcohols, substituted and unsubstituted acrylamides and methacrylamides, vinyl ethers, α,β-unsaturated aldehydes and ketones, vinyl alkyl ketones with 1 to 20 carbon atoms in the alkyl residue, vinyl ethers, vinyl esters, diesters of α,β-unsaturated dicarboxylic acids, styrene, styrene derivatives, such as for example α-methylstyrene.

The resultant macromonomers are then neutralised if the acid groups of the monomers bearing such groups were not used in neutralised form from the outset.

Neutralisation proceeds, for example, using aqueous solutions of alkali hydroxides or amines, for example trimethylamine, triethylamine, dimethylaniline, diethylaniline, triphenylamine, dimethylethanolamine, aminomethylpropanol, dimethylisopropanolamine or ammonia. Neutralisation may also be performed with mixtures of amines and ammonia.

In order to produce the polyurethane dispersion used as component A), the resultant macromonomers containing vinyl groups are converted into an aqueous dispersion by adding water and polymerised by free-radical initiated polymerisation using methods which are known per se. Unless already present as so-called reactive diluents, monomers of the type previously described as reactive diluents are added during this polymerisation operation and are then polymerised into the polyurethane.

The resultant polyurethanes have a number average molecular weight ($M_n$) of 30000 to 500000, preferably of 50000 to 250000. The proportion of unsaturated monomers to be polymerised into the polyurethane macromonomer is preferably greater than or equal to 5 wt. %, particularly preferably greater than or equal to 15 wt. %, related to the weight of the finished total resin.

The acid values of the polyurethane dispersions of component A) are in the range from 5 to 80 mg KOH/g, preferably 10 to 40 mg KOH/g.

Such polyurethane dispersions and the production thereof are, for example, described in DE-A-41 22 265.

The component a1) used in the production of binder component B) according to the invention preferably comprises linear polyols with terminal OH groups. Polyether polyols of the general formula I may, for example, be used.

$$H-[-O-(CHR^2)_n-]_m OH \qquad (I)$$

where
R$^2$=hydrogen or a lower alkyl residue (for example with 1 to 6 or 1 to 4 C atoms), optionally with one or more substituents,
n=2 to 6, preferably 3 to 4 and
m=at least 5, for example 5 to 50.

Examples are poly (oxytetramethylene) glycols, poly-(oxyethylene) glycols and poly(oxypropylene) glycols.

The polyether polyols preferably used are those with a molecular weight in the range between 500 and 3000, which may be produced without using ethylene oxide, i.e. in particular exclusively using propylene oxide or tetrahydrofuran. Their OH value is preferably 40 to 220.

Component a1) may also include hydrophilic polyols with one or two isocyanate-reactive hydrogen atoms, which polyols bear in their side chain polyether chains containing ethylene oxides, or mixtures thereof. These bring about improved dispersion of the polyurethanes in the aqueous phase.

Polyester polyols may moreover or additionally be used as component a1). The polyester polyols may, for example, be produced by esterification of organic dicarboxylic acids or the anhydrides thereof with organic polyols. The dicarboxylic acids and the polyols may be aliphatic or aromatic dicarboxylic acids and polyols.

The polyols used to produce the polyester polyols are, for example, diols such as alkylene glycols, for example ethylene glycol, butylene glycol, neopentyl glycol and other glycols such as dimethylolcyclohexane. It is also possible additionally to use small quantities of more highly functional OH components or mixtures thereof with monofunctional OH components, such as for example trimethylolpropane, pentaerythritol, glycerol, hexanetriol; polyethers which are condensation products of glycols with alkylene oxides; monoethers of such glycols, such as diethylene glycol monoethyl ether, tripropylene glycol monomethyl ether.

The acid component of the polyester polyol preferably primarily consists of low molecular weight dicarboxylic acids or the anhydrides thereof with 2 to 18 carbon atoms per molecule.

Suitable acids are, for example, phthalic acid, isophthalic acid, terephthalic acid, tetrahydrophthalic acid, hexahydrophthalic acid, adipic acid, sebacic acid, fumaric acid, maleic acid, glutaric acid, succinic acid or itaconic acid. It is also possible to use the anhydrides of these acids, where they exist, instead of the acids. It is also possible, in order to obtain branched polyesters, to add quantities of trifunctional carboxylic acids, such as trimellitic acid, malic acid, aconitic acid, bishydroxyethyltaurine, together with dimethylolpropionic acid.

The polyester polyols preferably have a molecular weight of 400 to 6000, an OH value of 20 to 280 and an acid value of less than 3. Linear polyester polyols are preferably used.

It is also possible to use polyester polyols, preferably diols, derived from lactones as component a1) in the invention. These products are, for example, obtained by reacting an ∈-caprolactone with a diol. Such products are, for example, described in U.S. Pat. No. 3,169,945.

The polylactone polyols obtained from this reaction are distinguished by the presence of terminal hydroxyl groups and polyester repeat units derived from the lactone.

These molecular repeat units may, for example, be of the general formula

(II)

in which n is preferably 4 to 6 and the substituent $R^3$ is hydrogen, an alkyl residue, a cycloalkyl residue or an alkoxy residue, wherein no substituent contains more than 12 carbon atoms and the total number of carbon atoms in the substituent in the lactone ring does not exceed 12.

The lactone used as starting material may be any desired lactone or any desired combination of lactones, wherein this lactone may, for example, contain 6 to 8 carbon atoms and wherein at least two hydrogen substituents are preferably present on the carbon atom which is attached to the oxygen group of the ring. The lactone used as starting material may be represented by the following general formula III:

(III)

in which n and $R^3$ have the meaning already stated.

The lactones preferred in the invention for the production of the polyester diols are ∈-caprolactones in which n has a value of 4. The most preferred lactone is unsubstituted ∈-caprolactone in which n has the value 4 and all the $R^3$ substituents are hydrogen. This lactone is particularly preferred because it is available in large quantities and produces coatings with excellent properties. Various other lactones may moreover also be used individually or combined.

Examples of aliphatic diols suitable for the reaction with the lactone include ethylene glycol, 1,3-propanediol, 1,4-butanediol, dimethylolcyclohexane.

Sequenced polydiols prepared from polyethers and polyesters may also be used.

The diols a1) are preferably substantially free of carboxyl groups, i.e. only very small proportions of unreacted COOH groups are present. The acid value is preferably less than 10 mg KOH/g, in general less than 5. These small proportions of optionally ionic groups or groups which may be converted into ionic groups make no contribution to stabilisation of the aqueous dispersions.

Mixtures of various diols a1) may also be used.

The optionally used low molecular weight compounds a2) are, for example, low molecular weight alcohols. These are compounds with a molecular weight of below 400 containing at least difunctional hydroxyl groups known per se from polyurethane chemistry in the context of an isocyanate addition reaction. Compounds which may be considered in the context of the isocyanate addition reaction are both difunctional compounds and at least trifunctional compounds or any desired mixtures of such compounds. In particular, it is preferred to use diols in the reaction.

Examples of such components are low molecular weight polyhydric alcohols, for example aliphatic alcohols, such as ethylene glycol, 1,2- and 1,3-propanediol, 1,4- and 1,3-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, trimethylolethane, isomeric hexanetriols or pentaerythritol or mixtures thereof. Such polyol compounds have, in particular, a molecular weight of less than 400.

The quantity of low molecular weight compound, a2) may be up to 30 wt. % related to a). The degree of branching may be controlled by means of the quantity of more highly functional polyols. Care must, however, be taken to ensure that crosslinking is largely avoided.

According to the invention, NCO-terminated compounds are used as component b), which are obtained by reacting compounds b1) bearing two isocyanate-reactive groups and at least one anionic group or group capable of forming anions with aliphatic, cycloaliphatic or aromatic diisocyanates b2). These are essentially low molecular weight compounds. In this reaction, the molar ratio of the non-ionic reactive groups to the isocyanate groups is 1:1.5 to 1:2.5. The ratio is preferably approximately 1:2. These compounds are then also readily soluble in organic solvents. The reaction preferably proceeds in liquid form, i.e. the mixture may optionally contain a proportion of organic non-reactive solvents. The temperature may optionally be raised somewhat to improve conversion.

Component b) may be added as a separate component. It is, however, also possible to produce and further react b) in situ from the mixture, in the presence of a).

Suitable isocyanate-reactive groups are in particular non-ionic groups such as hydroxyl groups, thiol groups and primary and secondary amino groups. Low reactivity, acidic groups capable of forming anions which may be considered are, for example carboxyl, phosphonic acid and sulphonic acid groups. Suitable compounds containing at least two isocyanate-reactive groups and at least one group capable of forming anions are, for example, dihydroxy acids and diamino acids. Suitable dihydroxy acids are, for example, aliphatic and aromatic dihydroxycarboxylic acids, such as dihydroxypropionic acid, dimethylolpropionic acid, dimethylolacetic acid, dimethylolbutyric acid, dihydroxysuccinic acid or dihydroxybenzoic acid. Polyhydroxy acids obtainable by oxidation of monosaccharides are also suitable, for example gluconic acid, saccharic acid, mucic acid, glucuronic acid and the like. Examples of compounds containing amino groups are diaminocarboxylic acids, such as α,δ-diaminovaleric acid, 3,4-diaminobenzoic acid, 2,4-diaminotoluene-5-sulphonic acid and 4,4-diaminodiphenyl ether sulphonic acid. Examples of compounds containing phosphoric acid groups are 2,2-dimethylolpropanephosphonic acid or diethanolaminemethanephosphonic acid. The dihydroxycarboxylic acids are preferred for production of an anionic urethane prepolymer, the use of dimethylolpropionic acid being particularly preferred.

Any desired organic diisocyanates or mixtures thereof may be reacted as component b2). Aliphatic or aromatic also sterically hindered isocyanates or oligomerised isocyanates may, for example, be used. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 2,4-tolylene diisocyanate, 2,6-tolylene diisocyanate, 1-isocyanato-methyl- 5-isocyanato-1,3,3-trimethylcyclohexane, bis-(4-isocyanatocyclohexyl)methane, bis-(4-isocyanatophenyl)methane, 4,4-diisocyanatodiphenyl ether, 1,5-dibutylpentamethylene diisocyanate, tetramethylxylylene diisocyanate and 2,3-bis-(81-isocyanatooctyl)-4-octyl-5-hexylcyclohexane.

The quantity of reaction product b) added to the mixture is such that the resultant polyesterurethane has an acid value of 5–50, preferably between 15 and 40. Phosphonic and sulphonic acids are added in corresponding quantities.

Component b) is, for example, here used in a quantity of approximately 0.5 to 7 wt. %, preferably approximately 0.8 to approximately 4.0 wt. % (calculated as carboxyl group) related to the urethane prepolymer to be produced. If the quantity of carboxyl groups is less than approximately 0.5%, it is difficult to produce a stable emulsion. On the other hand, if the quantity exceeds 7 wt. %, its hydrophilic nature is increased, making the emulsion highly viscous and reducing the water resistance of the coating.

The aqueous dispersion is stabilised by ionic groups. Ionic and non-ionic groups may also be used together. Stabilisation using solely anionic groups is preferred.

Any organic polyisocyanates may be used as component c) for production of the polyurethane dispersion, in particular also diisocyanates optionally as a mixture. These are, for example, the diisocyanates mentioned under b2) or oligomeric isocyanates. Non-yellowing or sterically hindered isocyanates with 4 to 25, preferably 6–16 C atoms are preferably used which contain in d-position relative to the NCO group one or two linear, branched or cyclic alkyl groups with 1 to 12, preferably 1 to 4 C atoms. The skeleton may, for example, consist of an aromatic or alicyclic ring or an aliphatic linear or branched C chain with 1 to 12 C atoms. Examples of such compounds are isophorone diisocyanate, 4,4'-diphenylpropane diisocyanate, xylylene diisocyanate, 1,1,6,6-tetramethylhexamethylene diisocyanate, p- and m-tetramethylxylylene diisocyanate and their corresponding hydrogenated homologues.

It is also possible to react polyisocyanates in which the isocyanate groups in excess of 2 have been irreversibly defunctionalised. Compounds to perform defunctionalisation which may be considered are, for example, low molecular weight, primary or secondary amines or alcohols.

The quantities of a), b) and c) or of a1), a2), b1) and b2) are selected such that on reaction a reaction product is produced with terminal OH groups, i.e. an excess of polyol is used. An OH to NCO ratio of 1.01 to 3:1 may be used, the range preferably being 1.05 to 2:1, particularly preferably 1.1 to 1.5:1. The reaction product may be of a branched structure, a linear structure is preferred. The reaction products have a number average molar mass ($M_n$) of 5000 to 50000, preferably greater than 8000 and less than 30000 and an OH value of 5 to 75, preferably greater than 10 and less than 50. The reaction may proceed in a mixture of all the components or in stages.

The reaction may proceed without solvents or it may, however, also be performed in solvents suitable for polyurethane synthesis familiar to the person skilled in the art. The solvents may remain in the batch or optionally be eliminated by distillation before further processing. Further additional solvents may also be added in order to reduce the viscosity of the polymer solution.

Suitable solvents are those which do not disrupt the reaction of the isocyanates. These are, for example, aromatic hydrocarbons such as benzene, toluene, xylene, esters, such as ethyl acetate, butyl acetate, ethylene glycol monomethyl ether acetate, ethylene glycol monoethyl ether acetate, methoxypropyl acetate, ethers such as tetrahydrofuran, dioxane, completely etherified mono- or diglycols of ethylene glycol or propylene glycol, such as diethylene glycol or dipropylene glycol dimethyl ether, ketones, such as acetone, methyl ethyl ketone, halogenated solvents such as methylene chloride or trichloromonofluoroethane. Solvents which facilitate dispersion in the aqueous phase are preferred. Solvents which subsequently have no negative effects in the coating compositions according to the invention are also preferred.

The OH-functionalised polyurethane prepolymer is chain-extended as an intermediate product by reaction with further polyisocyanates d). These are, for example, homogeneously mixed with the functionalised intermediate product and then reacted optionally by heating or the reaction promoted by catalysts customary in NCO chemistry, for example dibutyltin dilaurate (DBTL), amine derivatives. This may proceed in the organic or aqueous phase before or after salt formation of the groups which may be converted into anionic groups, the reaction preferably occurring after neutralisation in the organic phase.

Suitable polyisocyanates are, for example, customary known lacquer poly- or diisocyanates, as have been described above for components b2) and c). They may be on an aliphatic, cycloaliphatic or aromatic basis. They preferably have a molar mass of less than 1200.

Low molecular weight NCO-terminated prepolymers are also suitable as polyisocyanates d). These are preferably difunctional. Their molecular weight is preferably less than 1000.

The groups which may be converted into anionic groups are neutralised before or after chain extension. Bases are used to this end, for example ammonia or amines. Suitable amines are primary, secondary or tertiary amines, for example trialkylamines, such as trimethylamine, triethylamine, triisopropylamine, tri-n-propylamine and tri-n-butylamine; N-alkylmorpholines, such as N-methylmorpholines and N-ethylmorpholine; N-dialkylalkanolamines, such as N-dimethylethanolamine and N-diethyleneethanolamine; dialkylamines such as diethylamine, dibutylamine, diisopropylamine; alkylamines such as ectylamine, hexylamine, isopropylamine, aminoethanol; mixtures of at least two of these compounds. In general, between 30% and 100% of the acid groups are converted into salt groups.

The aqueous dispersion may be produced in a customary manner using known processes.

The polyurethane dispersion B) has an acid value of 5 to 50 (related to solids), preferably of 15 to 35, particularly preferably of 15–25. The solids content is preferably 25 to 55 wt. %. The $M_n$ of the binder is 10000 to 300000, preferably 50000 to 200000, particularly preferably 40000 to 100000. They may optionally also contain further functional groups, such as for example OH groups. The resultant dispersions have, for example, an average particle size of between 10 and 1000 nm, preferably 30 to 500, particularly preferably 30 to 150 nm.

The coating compositions according to the invention contain from 8 to 20 wt. %, related to the complete coating composition, of the binder containing components A) and B).

The water content of the coating composition according to the invention is 50 to 90 wt. %, preferably 60 to 85 wt. %. In order to improve film forming rheology and the metallic effect, the composition may contain up to 20 wt. %, for example 1 to 20 wt. %, preferably 6 to 15 wt. %, in each case related to the complete coating composition, of one or more solvents.

Solvents which may be considered are those as are, for example, customary in the lacquer sector as lacquer solvents and/or additives in aqueous coating compositions.

Suitable examples are aromatic solvents, such as xylene, esters, such as butyl acetate, glycol ethers, such as ethylene glycol monobutyl ether (2-butoxyethanol), alcohols, such as butanol, aliphatic hydrocarbons, such as for example mineral spirits.

The coating compositions according to the invention are particularly suitable for the production of effect, pearlescent or plain coloured base lacquer coats.

Where metallic pigments are used, 0.3 to 4 wt. % of one or more metallic pigments related to the complete coating composition are preferably used. Metallic pigments which may be considered are customary metal flake or scale pigments, such as metal bronzes, for example aluminium pigments, such as aluminium bronzes.

Further effect pigments may also be used, for example interference pigments such as mica coated with titanium dioxide or iron oxide, coated aluminium or graphite pigments.

In addition to the effect pigments, the coating composition may also contain further chromophoric pigments. For the production of plain colour lacquer coats, the compositions contain only chromophoric pigments. Pigments should be understood to include customary inorganic or organic extenders, as are familiar to the person skilled in the art of the lacquer sector.

Examples of inorganic or organic colouring pigments or extenders are titanium dioxide, micronised titanium dioxide, iron oxide pigments, carbon black, silicon dioxide, barium sulphate, micronised mica, talc, azo pigments, phthalocyanine pigments, quinacridone- or diketopyrrolepyrrole pigments.

The coating compositions according to the invention contain neutralising agents in order at least partially to neutralise the neutralisable groups. The degree of neutralisation of the neutralisable groups is preferably 40 to 120% of the neutralisable groups and is preferably less than 100%.

Neutralising agents for acid groups which may be considered are the-bases customary in the lacquer sector, such as the above-mentioned amines, ammonia or alkanolamines, such as N,N-dimethylethanolamine.

The coating compositions according to the invention optionally contain customary additives and auxiliary substances as are used in the lacquer sector. Such auxiliary substances and additives are thickeners, rheological additives, antifoaming agents, levelling agents, inhibitors (for example to inhibit gassing of aluminium pigments), dispersion and wetting additives.

The additives and auxiliary substances are added in customary quantities familiar to the person skilled in the art depending upon the desired effect.

The coating compositions according to the invention may be applied to various substrates using customary coating processes, for example by spraying or knife coating. Substrates which may be considered are metals, plastics, but also wood, glass and other substrates.

The coating compositions according to the invention are physically drying, i.e. they require no baking and may, for example, be dried at temperatures of the order of 15 to 60° C.

After application, the coating compositions according to invention may be coated with topcoat lacquers, in particular transparent topcoat lacquers (clear lacquers). Coating with topcoat lacquers may be performed wet-on-wet after brief flashing off or after drying of the base lacquer coat produced according to the invention. The topcoat lacquer coat may be dried together with the lacquer coat of the coating composition according to the invention. Topcoat lacquers which may be considered are customary, in particular transparent, lacquers, as are for example customary in the automotive sector. These are predominantly solvent-based lacquers, but water-based topcoat lacquers may also be used.

As mentioned above, the coating compositions according to the invention may be applied to the most varied substrates. They are particularly suitable for the production of base coats in multicoat lacquer structures. A preferred application which may be considered is lacquer coating motor vehicles or motor vehicle components. Thanks to their favourable physical drying properties, the coating compositions according to the invention are particularly suitable for the production of repair lacquer coatings or as repair lacquer. They are, however, also suitable for the production of mass produced baked lacquer coatings.

In contrast with other known aqueous coating compositions used as base lacquers, very good hardness of the total structure and excellent water resistance are achieved in multicoat structures with the coating compositions according to the invention. The properties achieved in this manner are comparable with those of solvent-based base lacquers.

The following examples are intended to illustrate the invention. Parts (pts.) and percentages relate to weight.

PRODUCTION EXAMPLE 1

Polyurethane dispersion A 249.8 g of a polyester produced from neopentyl glycol, 1,6-hexanediol, isophthalic acid and adipic acid with an hydroxyl value of 37 and an acid value of less than 3 are dissolved together with 24.7 g of dimethylolpropionic acid and 9.3 g of 1,4-butanediol in 150 g of acetone while being refluxed. 0.1 g of 2,6-di-tert.-butyl-4-methylphenol and 16.6 g of glycerol monomethacrylate are then added and homogenised. After adding 134.2 g of tetramethylxylylene diisocyanate, the mixture is stirred at refluxing temperature until the isocyanate content is 1.08 wt. %, related to the total weight of the starting materials.

15.5 g of diethanolamine are then quickly added to the resultant prepolymer solution and homogenised for 30 minutes. After addition of 13.1 g of triethylamine, 1108 g of water at a temperature of 80° C. are vigorously stirred into the polymer solution. The acetone solvent is then separated from the resultant dispersion by vacuum distillation. After adding 51.1 g of methyl methacrylate, the temperature is raised to 80° C. and the mixture stirred for a further 30 minutes. 10 vol. % of an ammonium persulphate solution consisting of 0.8 g of ammonium persulphate and 50 g of water are then added at 80° C. The remaining amount of the ammonium persulphate solution is metered in over a period of 30 minutes. The temperature is maintained at 78° to 80° C. for a further two hours.

After cooling to room temperature, the dispersion is adjusted to a solids content of 30% and filtered through a 5 mm filter. The resultant dispersion has a pH value of 7.46.

PRODUCTION EXAMPLE 2 polymethane dispersion B)

582 g of a customary commercial polyester ($M_n$=1000, OH value=106), 28.7 g of dimethylolpropionic acid (DMPA) and 124 g of N-methylpyrrolidone (NMP) are mixed and dissolved at 80° C. The mixture is then cooled to 50° C. 139 g of isophorone diisocyanate (IPDI) are added to the mixture, the temperature raised to 80° C. and 125 g of NMP added. The mixture is reacted to an NCO value of <0.1%.

33.2 g of dimethylisopropanolamine solution (50% in water) are added to the reaction product at 80° C. and stirred in for 10 minutes. 1174 g of completely deionised water are slowly added at 80° C. and thoroughly mixed in. The temperature may fall here to 50° C. 34.5 g of IPDI are added at 50° C. to the resultant aqueous dispersion within 10 minutes and the mixture then heated to 80° C.

A finely divided aqueous, stable dispersion is obtained.
Solids weight: 36% (determined after 30 minutes at 150° C. in circulating air oven)
Acid value: 17.4 mg KOH/g (solids)
MEQ-amine: 18.4 (milliequivalents per 100 g solids)
MEQ=milliequivalent.

PRODUCTION EXAMPLE 3

Production of metallic aqueous base lacquers

Aqueous metallic base lacquers are produced from dispersions A and B produced as above together with the following constituents:

23.6 pts. of dispersion A +11.8 pts. of dispersion B)
46.1* pts. of water
7.2 pts. of n-butanol
4.0 pts. of ethylene glycol monobutyl ether
0.5 pts. of N-methylpyrrolidone
0.3 pts. of a customary corrosion inhibitor to prevent aluminium gassing
2.1 pts. of a customary commercial thickener
0.2 pts. of N,N-dimethyleneethanolamine
4.1 pts. of a customary aluminium paste (60% Al)

The resultant metallic base lacquers have a viscosity of approximately 30 seconds (DIN cup, 4 mm nozzle, 23° C.) and are diluted with approximately 10% water to achieve a spraying viscosity of approximately 20 seconds. Lacquer coatings are produced with the dispersions as follows:

Lacquer coating tests:
Lacquer coating structure of the examined metal sheets:
Bright polished bodywork sheet metal
Customary single component polyvinylbutyral primer
Customary two component PU filler
Water base lacquer
Customary two component PU clear lacquer, medium solid grade, solids content 47%.

Aqueous adhesion primers and fillers may, however, also be used.

Application and drying of topcoat lacquer coat (base lacquer and clear lacquer):
Spray application of aqueous base lacquer
30 min pre-drying at room temperature
Spray application of clear lacquer
10 min flashing off at room temperature
30 min drying at 60° C.

Definitions:
pts.=parts by weight
PU=polyurethane

PRODUCTION EXAMPLE 4

Production of plain aqueous base lacquers

Aqueous plain base lacquers are produced from dispersions A and B produced as above together with the following constituents:

23.6 pts. of dispersion A) and
11.8 pts. of dispersion B)
21.1* pts. of water
12.1 pts. of ethylene glycol monobutyl ether
1.3 pts. of a customary commercial thickener
0.14 pts. of N,N-dimethylethanolamine
22.1 pts. of a customary commercial titanium oxide pigment
0.5 pts. of a customary commercial copper phthalocyanine pigment
0.16 pts. of a customary commercial defoamer
8.1 pts. of a customary commercial PU grinding auxiliary (solids content 30%)

* in each case, dispersions with a solids content of approximately 40%; if the solids content is low, the quantities of the dispersion and water are accordingly corrected such that usable coating compositions with the same solids content are produced.

The resultant plain base lacquers have a viscosity of approximately 40 to 50 seconds (DIN cup, 4 mm nozzle, 23° C.) and are diluted with approximately 10 to 15% water to achieve a spraying viscosity of approximately 20 seconds.

Lacquer coatings are produced in a similar manner to production example 3 using the plain base lacquers.

By way of comparison, a customary commercial solvent-borne base lacquer based on acrylate/cellulose acetobutyrate is applied in a lacquer coating structure corresponding to the described structure.

The properties of the resultant lacquer coatings are shown in the following table:

| Aqueous base lacquers based on: | Scratch resistance[1] | | Hardness[2] |
|---|---|---|---|
| | metallic | plain white | plain white |
| Dispersion A | 1 | 2 | 16 μm |
| Dispersion B | 1–2 | 2 | 18 μm |
| Dispersion A and B | 1–2 | 2 | 18 μm |
| Solvent-borne base lacquer | 1–2 | 2 | 15 μm |

| Aqueous base | Water resistance[1] | Metallic effect[2] |

-continued

| lacquers based on: | metallic | plain white | (flip flop) |
|---|---|---|---|
| Dispersion A | 2–3 | 3 | 1–2 |
| Dispersion B | 2–3 | 3 | 3 |
| Dispersion A and B | 1–2 | 2 | 1–2 |
| Solvent-borne base lacquer | 1–2 | 2 | 1–2 |

[1] 1 - very good
2 - good
3 - usable under certain circumstances
4 - unusable
[2] Vickers microindentation hardness at 250 mN (HV 100 tester from Fischer, Sindelfingen)

We claim:

1. Aqueous dispersion of a binder suitable for coating compositions containing a mixture of:

A) 45 to 95 wt. % of one or more polyurethanes, obtained by free-radical initiated polymerisation of polyurethane macromonomers containing carboxyl, phosphonic and/or sulphonic acid groups and lateral vinyl groups, optionally together with terminal vinyl, hydroxy, urethane, thiourethane and/or urea groups in the presence of one or more unsaturated monomers copolymerisable with the polyurethane macromonomer, in the form of an aqueous dispersion and B) 5 to 55 wt. % of one or more polyurethane resins containing ionic groups containing neither urea nor carbonate groups, which resins have a number average molar mass ($M_n$) of 10000 to 300000 and an acid value of 5 to 50 in the form of an aqueous dispersion, obtained by preparing a polyurethane prepolymer containing OH groups and having an OH value of 5 to 75 and a number average molar mass ($M_n$) of 5000 to 50000 by the reaction in an organic medium of a) one or more isocyanate-reactive compounds with an acid value of 0 to 10 in the form of
  a1) 70 to 100 wt. % of one or more polyester polyols and/or polyether polyols, in particular polyester diols, polyether diols with a molecular weight of 500 to 6000, together with
  a2) 30 to 0 wt. % of one or more compounds differing from a1) with at least two isocyanate-reactive groups with a molecular weight of 60 to 400 with b) one or more reaction products containing free isocyanate groups prepared from
  b1) at least one compound with two isocyanate-reactive groups and at least one anionic group or group capable of anion formation and
  b2) one or more organic diisocyanates in a quantity ratio such that the molar ratio of the isocyanate-reactive groups of b1) to the isocyanate groups of b2) is 1:1.5 to 1:2.5, wherein the reaction product b) may be produced in the presence of component a), wherein component b) is used in such a quantity that the finished polyurethane resins have the desired acid value and with c) one or more polyisocyanates with at least two free isocyanate groups per molecule in a quantity such that the molar ratio of the OH groups of component a) to the NCO groups of components b) and c) is 1.01:1 to 3:1, whereupon, before or after partial or complete neutralisation of groups which may be converted into ionic groups in the organic medium or after conversion into the aqueous phase, the prepolymer obtained from a), b) and c) is subjected to chain extension by reaction with d) one or more polyfunctional isocyanates with a free NCO group functionality of at least 1.8, in proportions such that the finished polyurethane resins have the desired number average molar mass, wherein the wt. % of the components A) and B) each relate to the resin solids content.

2. Aqueous coating composition containing 8 to 20 wt. %, related to the weight of resin solids, of a dispersion according to claim 1, 50 to 90 wt. % water, 0 to 20 wt. % of one or more organic solvents, 0.1 to 20 wt. % of one or more effect pigments and/or chromophoric pigments and/or extenders, neutralising agent to achieve a degree of neutralisation of the neutralisable groups of the binder of 40–120%, optionally together with customary additives and auxiliary substances.

3. Process for the production of multicoat lacquer coatings by applying a base coat of an aqueous coating composition onto an optionally pretreated substrate and subsequent application of a transparent topcoat lacquer, characterised in that a coating composition according to claim 2 is used as the aqueous coating composition for the base coat.

4. Process according to claim 3, characterised in that the aqueous base coat lacquer coat is dried at temperatures of 15 to 60° C.

5. Process according to claim 3, characterised in that the aqueous base lacquer coat is applied wet-on-wet with the transparent topcoat lacquer coat, whereupon the two coats of lacquer are dried together.

* * * * *